United States Patent
Youn

(10) Patent No.: US 10,427,043 B2
(45) Date of Patent: Oct. 1, 2019

(54) BICYCLE-TYPE GAME SIMULATION DEVICE

(71) Applicant: P&I SYSTEM, Jeju-do (KR)

(72) Inventor: Eun Seok Youn, Seoul (KR)

(73) Assignee: P&I SYSTEM, Jeju-do (KR)

( * ) Notice: Subject to any disclaimer, the term of this patent is extended or adjusted under 35 U.S.C. 154(b) by 119 days.

(21) Appl. No.: 15/570,591

(22) PCT Filed: Apr. 28, 2016

(86) PCT No.: PCT/KR2016/004476
§ 371 (c)(1),
(2) Date: Oct. 30, 2017

(87) PCT Pub. No.: WO2016/175587
PCT Pub. Date: Nov. 3, 2016

(65) Prior Publication Data
US 2018/0140949 A1    May 24, 2018

(30) Foreign Application Priority Data
Apr. 30, 2015  (KR) .......... 10-2015-0061967

(51) Int. Cl.
*A63F 13/428* (2014.01)
*A63F 13/21* (2014.01)
(Continued)

(52) U.S. Cl.
CPC ........ *A63F 13/428* (2014.09); *A63B 22/0605* (2013.01); *A63B 24/0087* (2013.01); *A63F 13/20* (2014.09); *A63F 13/21* (2014.09); *A63F 13/211* (2014.09); *A63F 13/24* (2014.09); *A63F 13/245* (2014.09); *A63F 13/285* (2014.09); *A63F 13/85* (2014.09); *A63G 31/16* (2013.01); *H02J 7/1407* (2013.01);
(Continued)

(58) Field of Classification Search
CPC ............... A63F 13/428; A63F 13/21
USPC ............ 463/7
See application file for complete search history.

(56) References Cited

U.S. PATENT DOCUMENTS 9,551,623 B2 * 1/2017 Biermann .......... A63B 24/0062
2007/0254778 A1 * 11/2007 Ashby ............... A63B 22/001
482/5
(Continued)

FOREIGN PATENT DOCUMENTS

JP            3127094 U    11/2006
KR    10-2009-0060485 A    6/2009
(Continued)

*Primary Examiner* — Pierre E Elisca
(74) *Attorney, Agent, or Firm* — Novick, Kim & Lee, PLLC; Jae Youn Kim

(57) ABSTRACT

The present invention relates to a bicycle-type game simulation device comprising: a crank pedal unit; a swing footrest horizontally rotatably installed in the crank pedal unit; a swing detection means which detects a left-and-right rotation of the swing footrest and transmits a signal thereof; and a forward-and-backward rotation detection means which detects a forward/reverse rotation of a crank shaft and transmits a signal thereof, wherein a user can easily operate a behavioral motion of a player in a game with his/her foot, using the mechanism of a crank pedal of a bicycle, so that the user can perceive a good sense of reality.

20 Claims, 14 Drawing Sheets

(51) Int. Cl.

| | |
|---|---|
| *A63G 31/16* | (2006.01) |
| *A63F 13/20* | (2014.01) |
| *A63F 13/211* | (2014.01) |
| *A63F 13/24* | (2014.01) |
| *A63F 13/285* | (2014.01) |
| *A63F 13/85* | (2014.01) |
| *A63B 22/06* | (2006.01) |
| *A63B 24/00* | (2006.01) |
| *H02J 7/14* | (2006.01) |
| *A63F 13/245* | (2014.01) |
| *A63F 13/235* | (2014.01) |
| *A63F 13/816* | (2014.01) |

(52) U.S. Cl.
 CPC .......... *A63B 2022/0641* (2013.01); *A63B 2024/0096* (2013.01); *A63F 13/235* (2014.09); *A63F 13/816* (2014.09)

(56) References Cited

U.S. PATENT DOCUMENTS

2009/0286654 A1* 11/2009 Rice .............. A63B 71/0622
 482/4
2012/0166105 A1* 6/2012 Biermann .......... A63B 24/0062
 702/43
2012/0240722 A1* 9/2012 Rogozinski ........ A63B 22/0015
 74/594.4

FOREIGN PATENT DOCUMENTS

| KR | 10-1061878 B1 | 9/2011 |
| KR | 10-1161491 B1 | 7/2012 |
| KR | 10-1246826 B1 | 3/2013 |

\* cited by examiner

BICYCLE-TYPE GAME SIMULATION DEVICE

TECHNICAL FIELD

The present invention relates to a game simulation device, and more particularly, to a bicycle-type game simulation device by which a user may easily perform a behavioral motion of a player (i.e. a character) in a game with his/her feet using the method of a crank pedal of a bicycle, whereby the user can experience a believable sense of reality as if he/she had actually become the player in the game and were walking or running and looking around, thus stimulating interest.

BACKGROUND ART

As is well known, electronic entertainment games using software programs have been widely used for a long time by children and adolescents. In recent years, with the development of personal computers (PCs) and the spread of high-speed Internet, online games are rapidly becoming active and it is no exaggeration to say that they have become a kind of culture that anyone can easily enjoy regardless of sex and age.

Based on this, the game industry is progressing rapidly, and the kinds of games include a wide range of games ranging from simple brain-teaser games to various combat games, sports games, motorcycle and car-racing games, and the like. Thus, users may choose and enjoy appropriate games according to their taste.

Meanwhile, these games are basically operated, in a state in which a PC or a game machine is provided, using a joystick and buttons of the game machine or using a keyboard and mouse of a PC in most cases, and since all actions including the behavioral motion of a player in a game are performed by the manipulation of the user who plays the game, the sense of realism is greatly reduced. Therefore, games developed at great expense and effort are often overlooked by users because of diminished interest for this reason.

In addition, for example, a car-racing game, which is installed in some large offline entertainment places such as an amusement park, is equipped with a vehicle operating device so that a user actually feels as though the vehicle were in motion. However, even in this case, the user cannot feel a sense of reality, with most games.

That is, although the user can perform all actions, such as starting, acceleration, changing-direction, and stopping the vehicle, similar to those as in a real vehicle, the user is sitting on a chair and using his/her hands and feet in a stationary state, and cannot feel the same experience as a player in a game, for example, an inertia phenomenon in which the user's body is slightly bent backward or tilted forward upon starting or stopping, or a leaning phenomenon in which the user's body is biased in one direction upon changing-direction.

Meanwhile, Korean Patent Laid-Open Publication No. 2000-0037168 discloses a bicycle exercise/game device, which may increase exercise effects while satisfying the criteria of realism and stimulation of interest in game play.

This technology allows an occupant of a stationary bicycle to control a handle while viewing a programmed screen (course), and allows the occupant to feel as if the occupant were actually riding a bicycle and obtain aerobic exercise effects by applying a load to a bicycle pedal depending on terrain features such as slopes and obstacles or by vibrating a saddle.

However, since the occupant can only manipulate the handle based on a traveling course displayed on the screen provided at the front in the state in which the bicycle is fixed, and the load on the pedal and vibration of the saddle are merely achieved depending on terrain features of the programmed course, this technology fails to realize realistic phenomena, such as an inertia phenomenon and a change in direction that the user's body can feel when actually riding a bicycle.

DISCLOSURE

Technical Problem

The present invention is devised to solve the problems of the related art described above, and it is one object of the present invention to provide a bicycle-type game simulation device by which a user may perform a behavioral motion of a player in a game with his/her feet using the method of a crank pedal of a bicycle, whereby the user can experience a believable sense of reality as if he/she had actually become the player in the game and were walking or running, changing direction, and looking around.

In addition, another object of the present invention is to provide a bicycle-type game simulation device by which an inertia phenomenon, which may be generated by the behavioral motion of a player in a game occurring when, for example, the player begins to run from a standstill state or stops running, may be applied to a user, whereby the user may enjoy the game with a greater sense of realism.

Technical Solution

To achieve the above-described object, in accordance with a first aspect of the present invention, to accomplish the above and other objects, there is provided a bicycle-type game simulation device including a crank pedal unit including a crankshaft, a pair of crank arms respectively fixed at one end thereof to opposite ends of the crankshaft so as to be angularly diametrically opposed to each other, a pedal shaft rotatably supported by a free end of each crank arm, and a crank pedal rotatably coupled to the pedal shaft, a swing footrest horizontally rotatably installed to the crank pedal, a swing detector configured to detect leftward/rightward rotation of the swing footrest and transmit a signal thereof, and a forward-and-backward rotation detector configured to detect forward/reverse rotation of the crankshaft and transmit a signal thereof.

With the exemplary feature of the first aspect of the present invention, the swing detector may detect the leftward/rightward rotation of the swing footrest by detecting rotation of a hinge shaft by which the swing footrest is rotatably coupled to the crank pedal.

With another exemplary feature of the first aspect of the present invention, the bicycle-type game simulation device may further include a swing transmitter configured to transmit the leftward/rightward rotation of the swing footrest to the pedal shaft, and the swing detector may detect the leftward/rightward rotation of the swing footrest by detecting forward/reverse rotation of the pedal shaft.

In addition, with another exemplary feature of the first aspect of the present invention, the swing transmitter may include driving and driven bevel gears fixed respectively to the swing footrest and the pedal shaft and engaged with each other, and the swing detector may be installed in the crank pedal. In this case, the swing detector may transmit a detected signal thereof in a wireless transmission manner.

When the swing detector performs wireless transmission, the swing detector may further include a battery inside the crank pedal, and may further include an electric generator to charge the battery via rotation of the crankshaft.

With another exemplary feature of the first aspect of the present invention, the swing transmitter may include driving and driven bevel gears fixed respectively to the swing footrest and the pedal shaft and engaged with each other, a swing detection guide rotatably coupled to the crankshaft, and a linkage unit configured to link the pedal shaft and the swing detection guide to each other, and the swing detector may detect rotation of the pedal shaft by detecting forward/reverse rotation of the swing detection guide.

In this case, the bicycle-type game simulation device may further include a swing footrest movement prevention unit configured to prevent the swing footrest and the crank pedal from moving without a user operation.

The swing footrest movement prevention unit may include a first timing pulley fixed to the crank pedal, a second timing pulley rotatably coupled to the crankshaft, and a timing belt coupling the first and second timing pulleys.

Here, game programs may be set to cause a player in a game to perform walking forward and backward via the forward/reverse rotation of the crank pedal unit, to change the speed at which the player moves in proportion to the speed at which the crank pedal unit rotates, and to induce an inertia phenomenon in a chair of a user. In addition, game programs may be set to change the direction of the player in the game leftward or rightward, and simultaneously, move the background screen depending on the leftward/rightward rotation of each swing footrest. For example, game programs may be set to cause the player in the game to perform various behavioral motions such as sitting or standing using the rotation of two swing footrests.

In accordance with a second aspect of the present invention, there is provided a bicycle-type game simulation device including a crank pedal unit including a crankshaft, a pair of crank arms respectively fixed at one end thereof to opposite ends of the crankshaft so as to be angularly diametrically opposed to each other, a pedal shaft rotatably supported by a free end of each crank arm, and a crank pedal rotatably coupled to the pedal shaft, a swing footrest horizontally rotatably installed to the crank pedal, a plurality of swing detectors configured to detect leftward/rightward rotation of the swing footrest and transmit a signal thereof, a forward-and-backward rotation detector configured to detect forward/reverse rotation of the crankshaft and transmit a signal thereof, and a forward-and-backward pivotable rotation unit configured to pivotably rotate a chair on which a user sits forward and backward in response to the signal of the forward-and-backward rotation detector.

With the exemplary feature of the second aspect of the present invention, the forward-and-backward pivotable rotation unit may include a pedestal pivot-connected to a lower surface of a seat of the chair, a fluctuating link having a vertically elongated hole and fixed to the seat of the chair, a cam provided on the pedestal so as to be coupled to the elongated hole in the fluctuating link, and a cam motor configured to drive the cam forward or in reverse in response to the signal of the forward-and-backward rotation detector.

In accordance with a third aspect of the present invention, there is provided a bicycle-type game simulation device including a crank pedal unit including a crankshaft, a pair of crank arms respectively fixed at one end thereof to opposite ends of the crankshaft so as to be angularly diametrically opposed to each other, a pedal shaft rotatably supported by a free end of each crank arm, and a crank pedal rotatably coupled to the pedal shaft, a swing footrest horizontally rotatably installed to the crank pedal, a plurality of swing detectors configured to detect leftward/rightward rotation of the swing footrest and transmit a signal thereof, a forward-and-backward rotation detector configured to detect forward/reverse rotation of the crankshaft and transmit a signal thereof, and a leftward-and-rightward rotation unit configured to pivotably rotate a chair on which a user sits leftward and rightward in response to the signal of the swing detectors.

In the third aspect of the present invention, the leftward-and-rightward rotation unit may include a base configured to support the chair so as to enable leftward/rightward rotation of the chair, and a swing motor configured to pivotally rotate the chair leftward and rightward in response to the signal of the swing detectors, and may further include a plurality of wheels for smoother stabilized rotation.

In addition, in accordance with a further aspect of the present invention, there is provided a bicycle-type game simulation device including a crank pedal unit including a crankshaft, a pair of crank arms respectively fixed at one end thereof to opposite ends of the crankshaft so as to be angularly diametrically opposed to each other, a pedal shaft rotatably supported by a free end of each crank arm, and a crank pedal rotatably coupled to the pedal shaft, a swing footrest horizontally rotatably installed to the crank pedal, a plurality of swing detectors configured to detect leftward/rightward rotation of the swing footrest and transmit a signal thereof, a forward-and-backward rotation detector configured to detect forward/reverse rotation of the crankshaft and transmit a signal thereof, a forward-and-backward pivotable rotation unit configured to pivotably rotate a chair on which a user sits forward and backward in response to the signal of the forward-and-backward rotation detector, and a leftward-and-rightward rotation unit configured to pivotably rotate a chair on which a user sits leftward and rightward in response to the signal of the swing detectors.

Advantageous Effects

With a bicycle-type game simulation device according to the present invention, a player in a game walks or runs in conjunction with a user motion in which a user who plays a game operates a crank pedal, and the player changes direction leftward and rightward, and at the same time, a screen of the device is moved as the user rotates a swing footrest provided on the crank pedal leftward and rightward, whereby the user may experience a believable sense of reality as if he/she had actually become the player in the game and were walking or running, changing direction, and looking around, unlike the related art, in which all behavioral motions of the player in the game depend on a keyboard, a mouse or the like.

In particular, an inertia phenomenon, which may be generated when the player in the game begins to run in a standstill state or stops running, i.e. a phenomenon in which the user's body is tilted forward or backward may be applied to the user who plays the game, whereby the user may enjoy the game with a greater sense of realism.

In addition, since the user may easily perform a movement motion of the player in the game with his/her feet, increased operation convenience may be provided. Moreover, since the user needs to continuously operate the crank pedal while playing the game, exercise effects may also be expected.

BEST MODE

Figure 1:
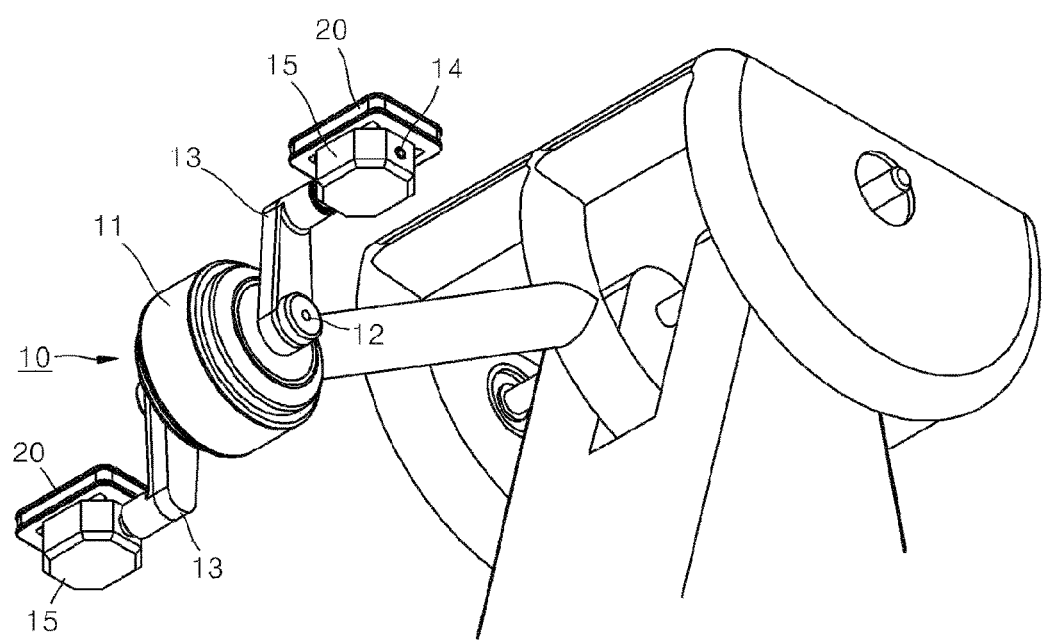
FIG. 1 is a perspective view illustrating a bicycle-type game simulation device according to the present invention.
Figure 2:
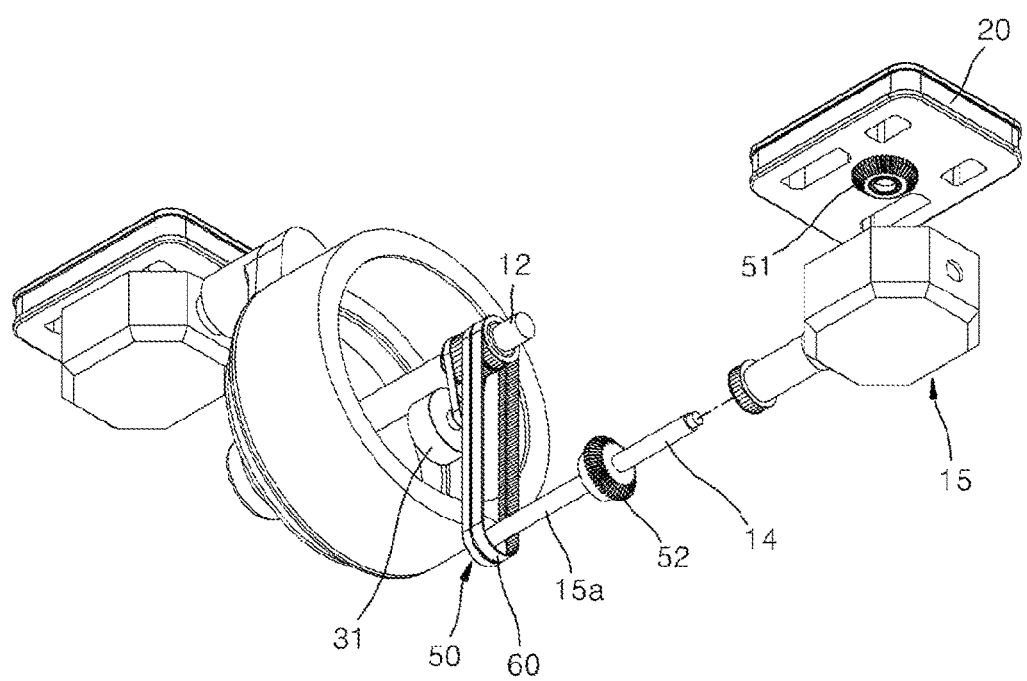
FIG. 2 is a partial exploded perspective view illustrating important parts of the bicycle-type game simulation device according to the present invention.
Figure 3:
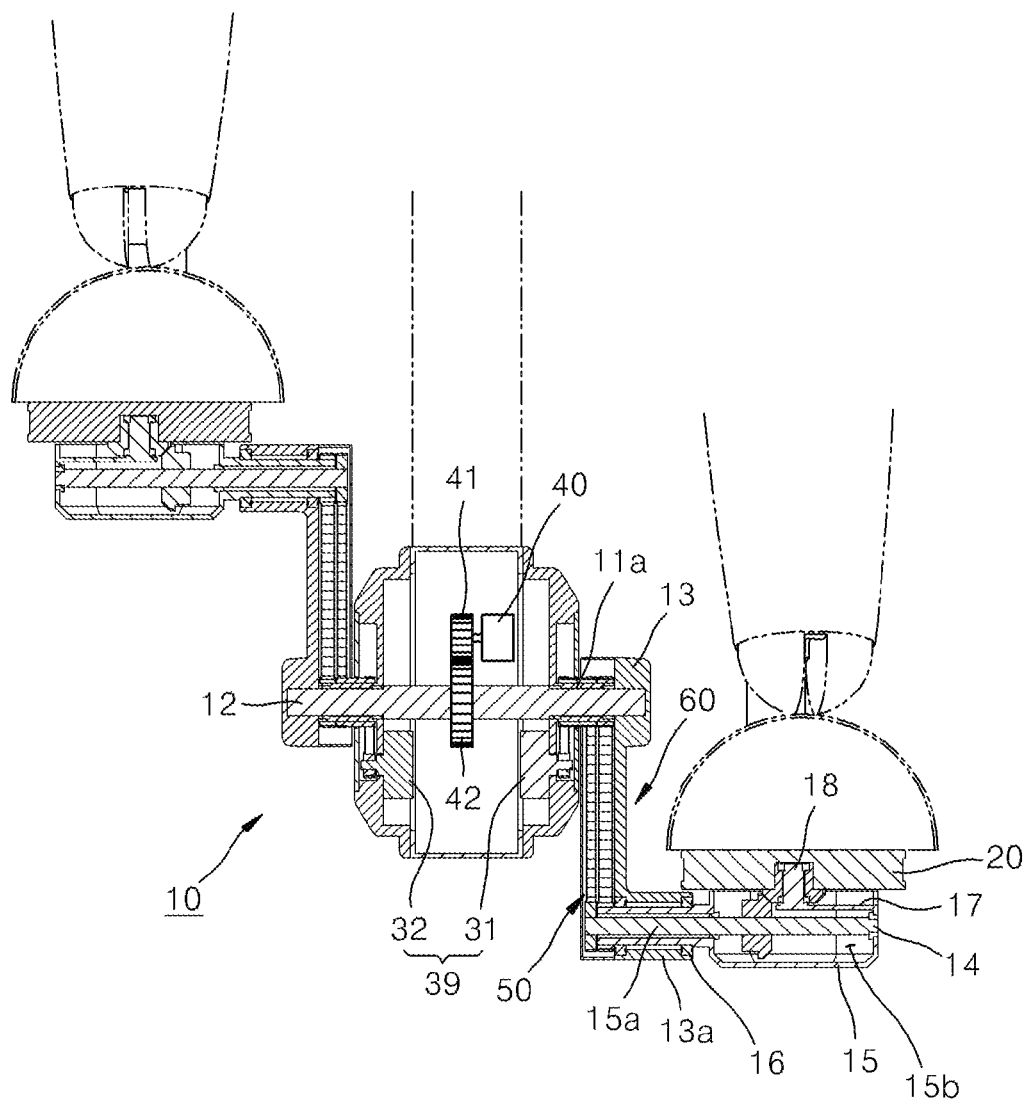
FIG. 3 is a cross-sectional view of the bicycle-type game simulation device according to the present invention.
Figure 4:
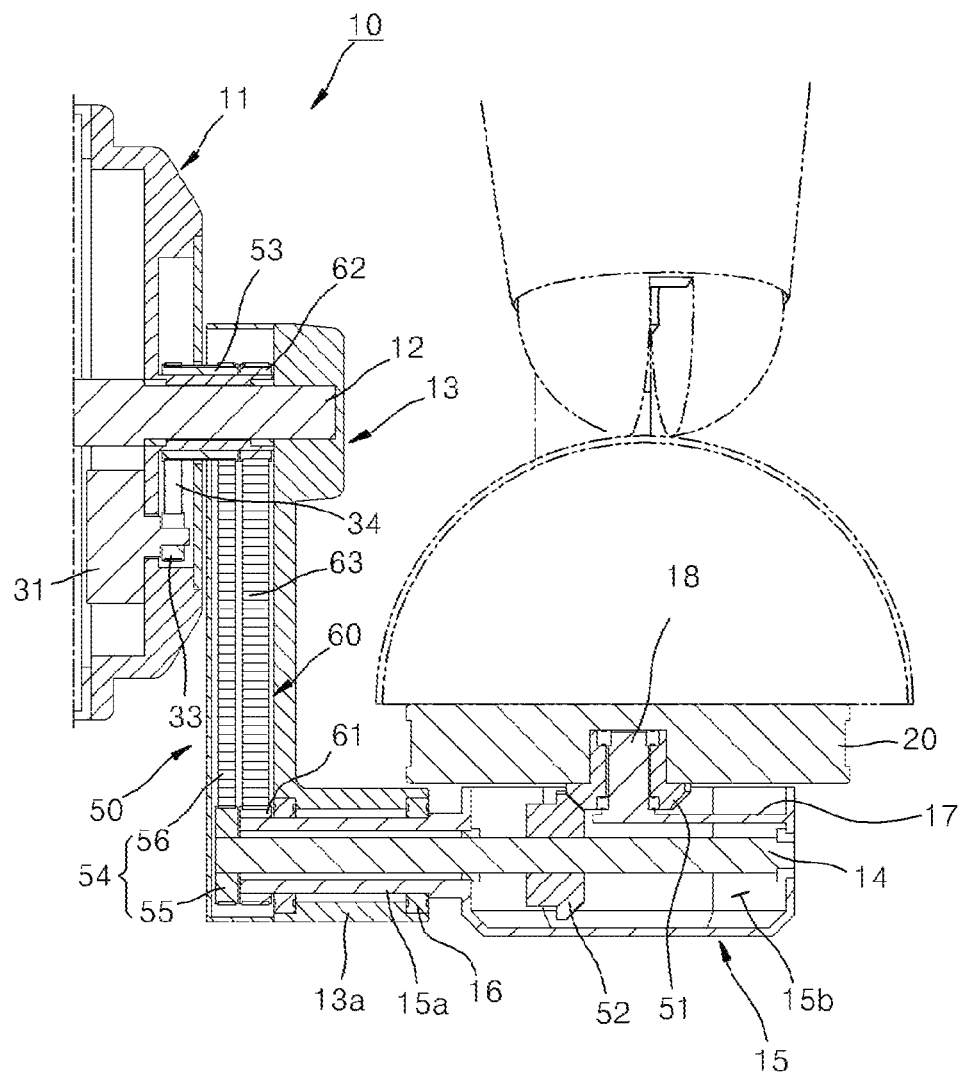
FIG. 4 is a cross-sectional view illustrating important parts of the bicycle-type game simulation device according to the present invention.

Concrete features and other advantages of a bicycle-type game simulation device according to the present invention will be made more apparent by the following description of exemplary embodiments with reference to the accompanying drawings.

Referring to FIGS. 1 to 5, the bicycle-type game simulation device according to the present invention includes a crank pedal unit 10, a swing footrest 20, which is horizontally rotatably installed to a crank pedal 15 of the crank pedal unit 10, a plurality of swing detectors 30, which detects the leftward-and-rightward rotations of the swing footrest 20 and transmits a signal thereof, and a forward-and-backward rotation detector 40, which detects the forward/reverse rotation of a crankshaft 12 of the crank pedal unit 10 and transmits a signal thereof.

The crank pedal unit 10 includes a crank housing 11, the crankshaft 12, which horizontally penetrates the crank housing 11 to thereby be rotatably supported, a pair of crank arms 13, which are respectively fixed at one end thereof to opposite ends of the crankshaft 12 so as to face opposite directions, a pedal shaft 14, which is horizontally installed to the free end of each crank arm 13 so as to be orthogonal thereto, and the crank pedal 15, which is rotatably installed to the pedal shaft 14. Thus, the crank pedal unit 10 takes substantially the same shape as a crank pedal that is used on a typical bicycle.

The crank housing 11 is provided on opposite sides thereof with protruding bearings 11a, which take the form of sleeves to rotatably support the crankshaft 12. Both the ends of the crankshaft 12 penetrate the bearings 11a of the crank housing 11 so as to protrude outward in opposite directions, thereby being fixed to the respective crank arms 13.

Each crank arm 13 has a boss portion 13a formed on the free end thereof, and the pedal shaft 14 is provided coaxially with the boss portion 13a. Meanwhile, the crank pedal 15 may be directly coupled to the pedal shaft 14, but may include a coupling sleeve 15a, which protrudes from one side thereof so that the pedal shaft 14 is rotatably inserted thereinto, so as to be rotatably coupled to the boss portion 13a of the crank arm 13. This serves to allow the swing detectors 30 to be installed inside the crank housing 11, which will be described later, and the tip end of the coupling sleeve 15a penetrates the boss portion 13a of the crank arm 13 so as to appropriately protrude therefrom.

Here, a bearing or a bushing 16 may be interposed between the boss portion 13a of the crank arm 13 and the coupling sleeve 15a of the crank pedal 15, in order to ensure smooth rotation of the crank pedal 15. In addition, the crank pedal 15 has a space 15b having an open top for the installation of a swing transmitter 50, which will be described later, and a partition plat 17 having a vertically protruding hinge shaft 18 is horizontally provided in the space 15b so as not to interfere with the pedal shaft 14.

The swing footrest 20 may be configured in any of various forms, and for example, may have a rectangular block shape as illustrated, but may have any other shape so long as a user U can conveniently seat the foot thereon and stably operate it. To this end, although not separately illustrated, it should be noted that a nonslip pad or the like may be further provided on the upper surface of the swing footrest 20, i.e. the surface with which the foot of the user U is brought into contact.

The swing footrest 20 has a hinge aperture 21 formed in the center of the lower surface thereof so that the hinge shaft 18, which protrudes upward from the crank pedal 15, is rotatably assembled into the hinge aperture 21. As such, the swing footrest 20 may rotate forward and backward along with the crank pedal 15, and may also rotate leftward and rightward relative to the crank pedal 15.

Figure 5:
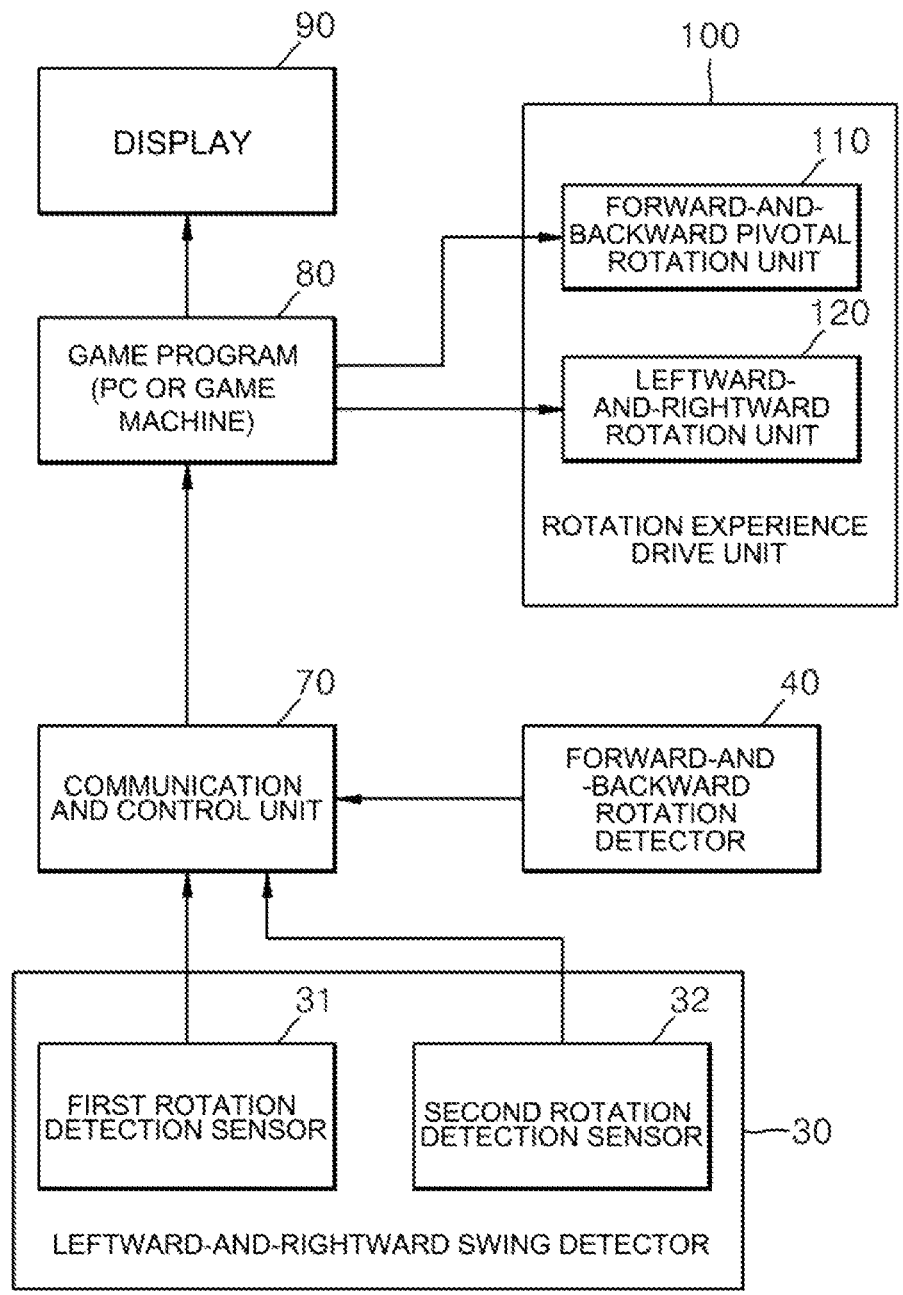
FIG. 5 is a block diagram for explaining the configuration of the bicycle-type game simulation device according to the present invention.

The swing detectors 30, as illustrated in FIG. 5, detect the direction in which and the angle at which the swing footrest 20 rotates leftward and rightward, and transmits the detected signal to a communication and control unit 70.

Then, the communication and control unit 70 transmits the corresponding signal to a game program 80 (a PC or a game machine). Thus, the game program 80 transmits a drive signal to a leftward-and-rightward rotation unit 120 of a rotation experience drive unit 100 in response to the transmitted detected signal of the swing detectors 30 so as to cause the user who is playing the game to be rotated in the same direction as the player in the game, and at the same time, changes the direction of the player in the game leftward and rightward while moving a display 90 leftward and rightward in response to the corresponding signal.

The swing detectors 30 may be configured in any of various forms, and for example, may be an encoder or angle sensor.

Here, the swing detectors 30 of the bicycle-type game simulation device according to the present invention include two first and second rotation detection sensors 31 and 32, which are provided respectively on a pair of crank pedals 15, which are respectively provided on the left and right sides of the crank pedal unit 10. Various behavioral motions of the player in the game may be realized using the leftward/rightward rotation of these sensors.

That is, it may be set such that the player in the game changes the direction thereof and the display is moved only when the first and second rotation detection sensors 31 and 32 are rotated in the same direction, and such that the player in the game makes a motion different from the change in direction according to each rotation direction, for example, a sitting or lying motion or any of various special social actions when the first and second rotation detection sensors 31 and 32 are rotated in different directions or when only one rotation detection sensor 31 or 32 is rotated leftward or rightward.

Meanwhile, the first and second rotation detection sensors 31 and 32 of the swing detectors 30 described above may be installed at any positions so long as they are capable of detecting the rotation of the swing footrest 20, but may be configured to detect the leftward/rightward rotation of the swing footrest 20 by detecting the forward/reverse rotation of the pedal shaft 14 via the swing transmitter 50, which transmits the rotation of the swing footrest 20 to the pedal shaft 14.

In the illustrated embodiment, the swing detectors 20 are installed inside the crank housing 11 via the swing transmitter 50.

To this end, the swing transmitter 50 includes driving and driven bevel gears 51 and 52, which are respectively fixed to the swing footrest 20 and the pedal shaft 14 and are engaged with each other, a swing detection guide 53, which is rotatably coupled to the crankshaft 12, and a linkage unit 54, which links the pedal shaft 14 and the swing detection guide 53 to each other.

The driving bevel gear 51 is fitted into and fixed to the hinge aperture 21 in the swing footrest 20 and is rotatably coupled to the hinge shaft 18 of the crank pedal 15, thereby directly transmitting the rotation of the swing footrest 20 to the driven bevel gear 51.

The swing detection guide 53 is configured in a pipe shape and is rotatably coupled to the outer periphery of the bearing 11a of the crank housing 11. The swing detection guide 53 may be configured as a timing pulley having a spline on the outer periphery thereof for transmission coupling with the linkage unit 54, which will be described later.

The linkage unit 54 includes a driving pulley 55, which is fixed to a protruding portion of the pedal shaft 14, which penetrates and protrudes from the boss portion 13a of the crank arm 13, and a transmission belt 56, which connects the driving pulley 55 to the swing detection guide 53. It should be noted that the driving pulley 55 and the transmission belt 56 of the linkage unit 54 take the form of a timing pulley and a timing belt.

The first and second rotation detection sensors 31 and 32 respectively include driven pulleys 33, which take the form of a timing pulley, so as to be connected together to the swing detection guide 53 using a linkage belt 34, thereby detecting the leftward/rightward rotation of the swing footrest 20 via the forward/reverse rotation of the swing detection guide 53.

Meanwhile, in the case where the swing detector 30 is provided inside the crank housing 11, the position of the crank pedal 15 may be set so that the swing footrest 20 is continuously located above the crank pedal 15. That is, since the crank pedal 15, which is rotatably coupled to the pedal shaft 14, may be rotated by the weigh thereof, there is a risk of causing malfunction of the first and second rotation detection sensors 31 and 32 due to the movement of the swing transmitter 50, more particularly, the linkage unit 54, regardless of the rotation of the swing footrest 20.

Therefore, in the case where the swing detectors 30 are provided inside the crank housing 11, in order to prevent the swing footrest 20 from arbitrarily rotating even when the swing footrest 20 is not operated to rotate, a swing footrest movement prevention unit 60 may be further provided.

The swing footrest movement prevention unit 60 may include a first timing pulley 61, which is fixed to the coupling sleeve 15a of the crank pedal 15, a second timing pulley 62, which is rotatably coupled to the outer periphery of the bearing 11a of the crank housing 11, which rotatably supports the crankshaft 12 inserted thereinto, and a timing belt 63, which couples the first and second timing pulleys 61 and 62 to each other.

The swing footrest movement prevention unit 60 may set the position of the crank pedal 15 so that the swing footrest 20 is continuously located above the crank pedal 15 regardless of whether or not the crank pedal unit 10 is operated, thereby reliably preventing the malfunction of the swing detectors 30.

Figure 6:
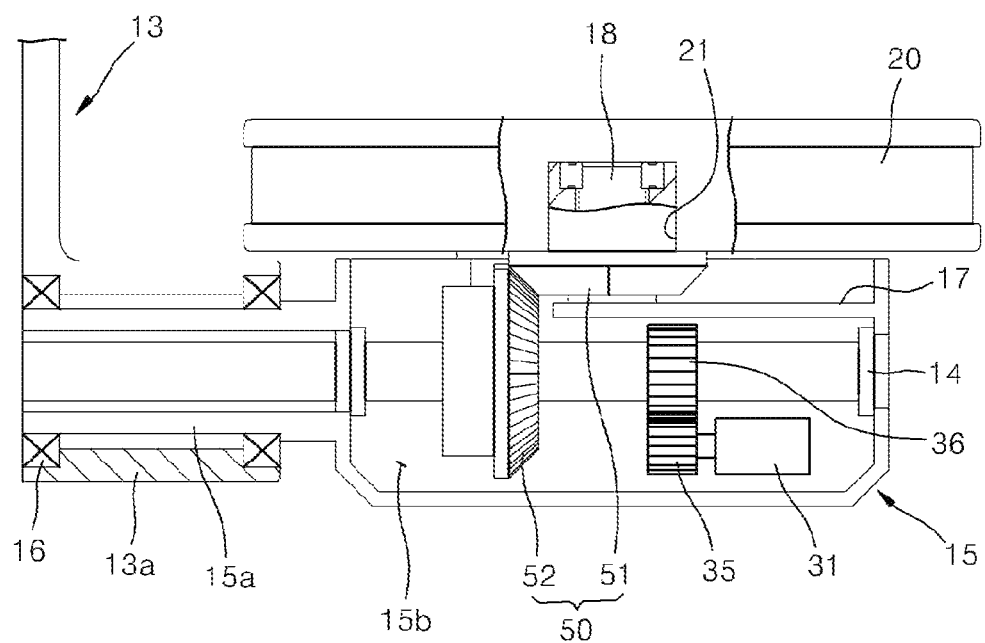
FIG. 6 is a cross-sectional view illustrating extracted important parts of a crank pedal unit according to another embodiment of the bicycle-type game simulation device according to the present invention.

FIG. 6 illustrates another embodiment of the swing transmitter 50 for transmitting the leftward/rightward rotation of the swing footrest 20 to the pedal shaft 14.

Unlike the configuration of the swing transmitter 50 according to the above-described embodiment, the swing transmitter 50 of the present embodiment includes only the driving bevel gear 51, which is fixed to the hinge aperture 21 in the swing footrest 20 and is rotatably coupled to the hinge shaft 18 of the crank pedal 15, and the driven bevel gear 52, which is fixed to the pedal shaft 14 so as to be engaged with the driving bevel gear 51. In this case, the swing detectors 30 are installed in the space 15b of the crank pedal 15.

In addition, each of the first and second rotation detector sensors 31 (in FIG. 6, only one is illustrated) of the swing detector 30 includes a driven gear 35 so that the driven gear 35 is engaged with a driving gear 36, which is fixed to the pedal shaft 14, thereby detecting the leftward/rightward rotation of the swing footrest 20 via the forward/reverse rotation of the pedal shaft 14. Here, the driving and driven gears 36 and 35 may be replaced with a timing pulley and a timing belt.

In the case where the swing detectors 30 are provided inside the crank pedal 15 as described above, the swing detectors 30 may perform wireless communication in consideration of the structural characteristics of the crank pedal unit 10. It should be noted that the swing detector may perform wired communication via a slip ring even in this case.

Meanwhile, in the case where the swing detector 30 is configured to perform wireless communication, although not separately illustrated, a battery may further be provided inside the crank pedal 15 in order to supply power to the swing detector 30, and an electric generator may further be provided to generate power by the rotation of the crank pedal unit 10 so as to charge the battery.

The forward-and-backward rotation detector 40 is installed inside the crank housing 11 and includes a driving gear 41, which is engaged with a driven gear 42 fixed to the crankshaft 12, thereby detecting the forward/reverse rotation of the crankshaft 12 and transmitting the detected signal to the communication and control unit 70.

Then, the communication and control unit 70 transmits the detected signal transmitted from the leftward-and-rightward rotation detector 40 to the game program 80. Thus, the game program 80 realizes an inertia phenomenon in the behavioral motion of the player in the game, and transmits the corresponding signal to a forward-and-backward pivotable rotation unit 110 of the rotation experience drive unit 100 so as to cause the user U who plays the game to experience the same inertia phenomenon as the player in the game.

The forward-and-backward rotation detector 40 may be configured in any of various forms, and for example, may be a photosensor.

Figure 7:
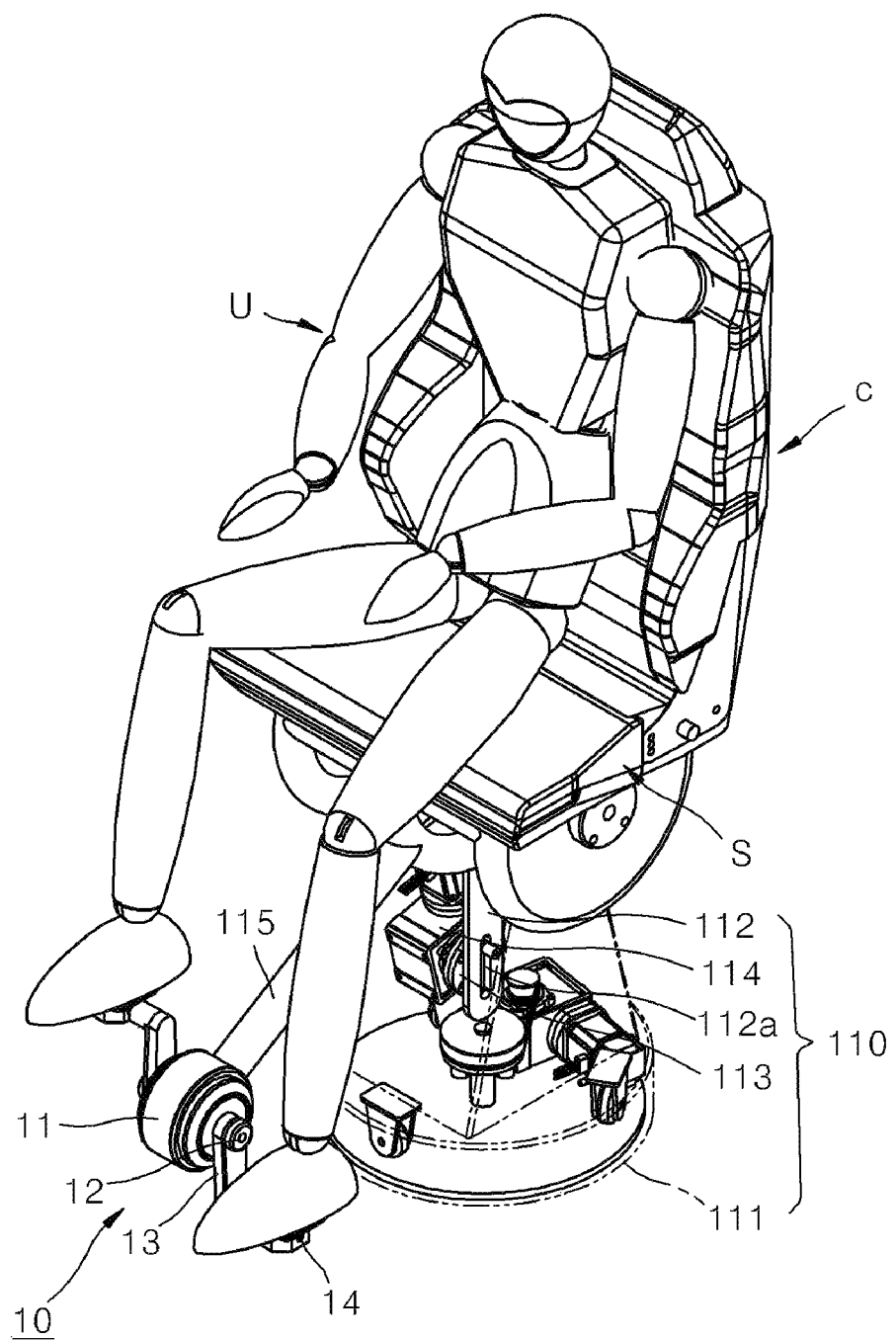
FIG. 7 is a partially cut away perspective view illustrating a further embodiment of the bicycle-type game simulation device according to the present invention.
Figure 8:
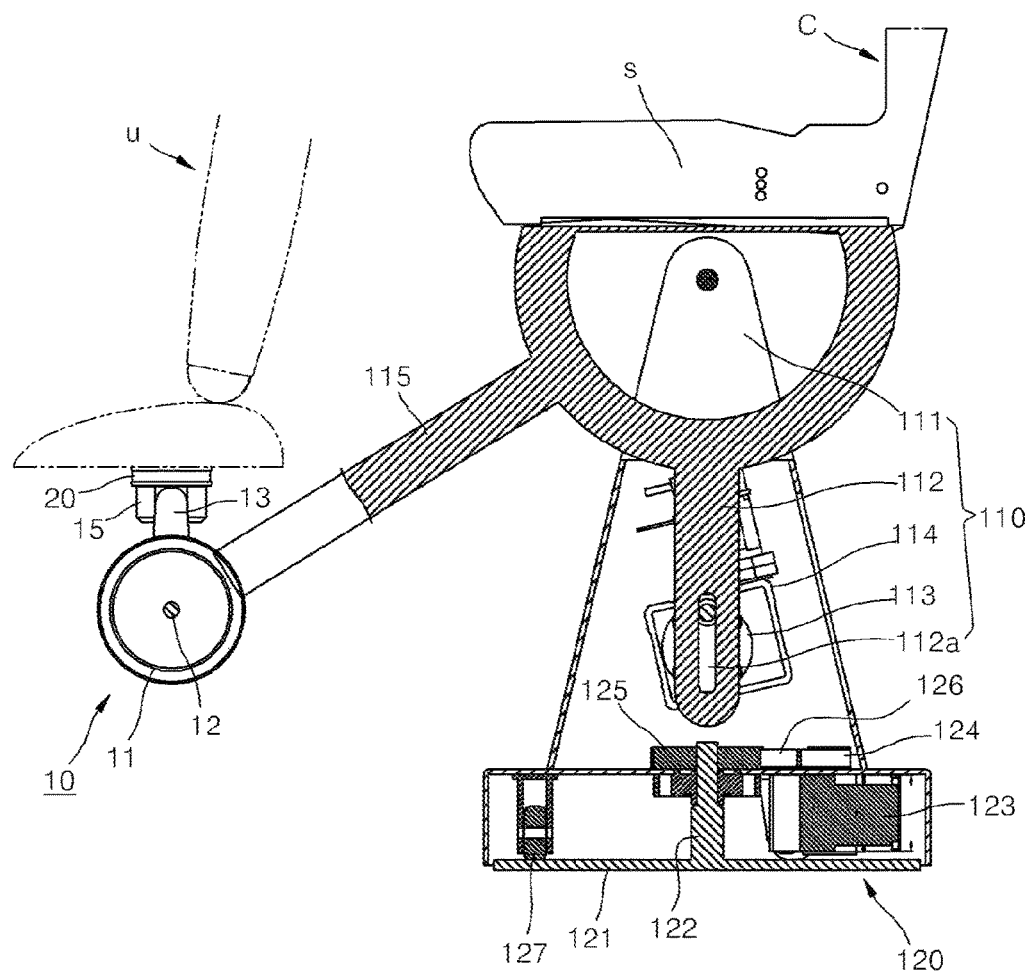
FIG. 8 is a side sectional view of the embodiment illustrated in FIG. 7.
Figure 9:
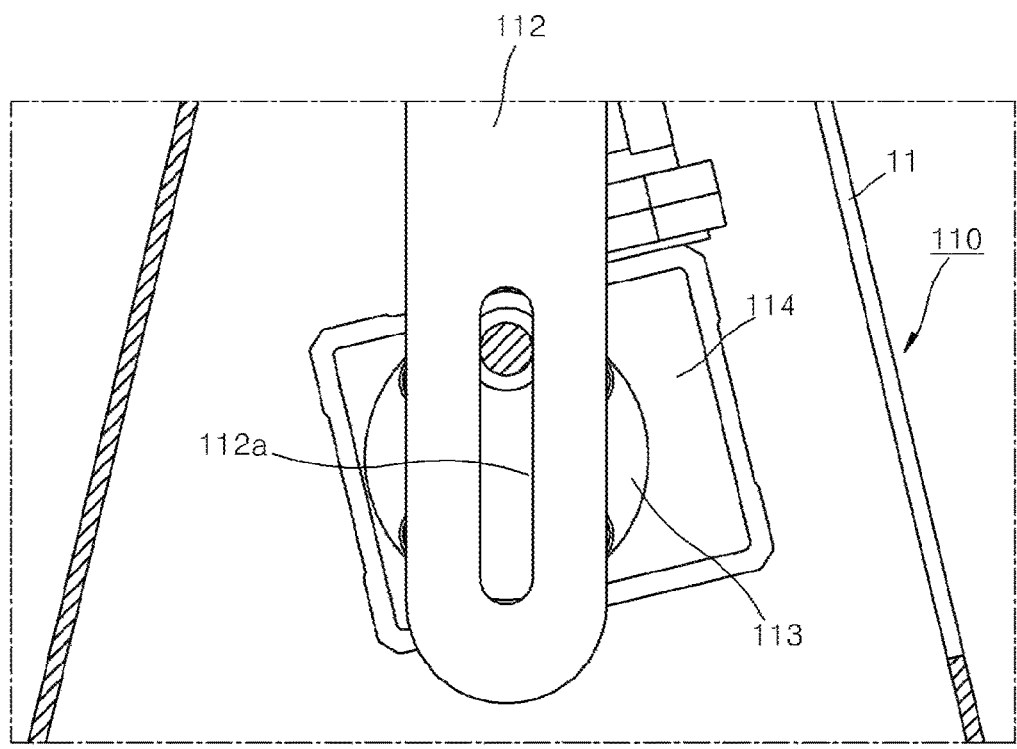
FIG. 9 is a side view illustrating a forward-and-backward pivotable rotation unit of the embodiment illustrated in FIG. 7, FIGS. 10A to 10C are side views illustrating the operating state of the forward-and-backward pivotable rotation unit illustrated in FIG. 9.

Meanwhile, the bicycle-type game simulation device according to the present invention may further include, as illustrated in FIGS. 7 and 8, the rotation experience drive unit 100, which may rotate a chair C, on which the user U who plays the game sits, leftward and rightward and may also pivotably rotate the chair C forward and backward in response to the detected signals of the swing detector 30 and the forward-and-backward rotation detector 40.

The rotation experience drive unit 100 includes the leftward-and-rightward rotation unit 120, which rotates the chair C on which the user U sits leftward and rightward depending on the leftward/rightward rotation of the swing footrest 20, and the forward-and-backward pivotable rotation unit 110, which pivotably rotates the chair C forward and backward by an appropriate angle depending on the forward/backward rotation of the crankshaft 12.

The forward-and-backward pivotable rotation unit 110 includes a pedestal 111, which is pivotably connected to the lower surface of a seat S of the chair C, a fluctuating link 112, which has a vertically elongated hole 112a and is fixed to the seat S of the chair C, a cam 113, which is installed on the pedestal 111 so as to be coupled to the elongated hole 112a in the fluctuating link 112, and a cam motor 114, which drives the cam 113 forward and in reverse in response to the signal of the forward-and-backward rotation detector 40.

The fluctuating link 112 is vertically fixed to the seat S and is partially embedded in the pedestal 111, and the cam motor 114 is fixed to the inner wall of the pedestal 111. In addition, the fluctuating link 112 is provided with a support bar 115, which is tilted forward to form an appropriate angle relative to the fluctuating link 12 and serves to fix the crank pedal unit 10.

Thus, when the user U who sits on the chair C operates the crank pedal unit 10 or stops the operation thereof, the cam motor 114 is driven in response to the signal of the forward-and-backward rotation detector 40, causing the fluctuating link 112 to perform reciprocating pivotable rotation within a predetermined angular range about a pivot along the elongated hole 112a thereof, whereby the chair C is pivotably rotated forward and backward.

Figure 10A:
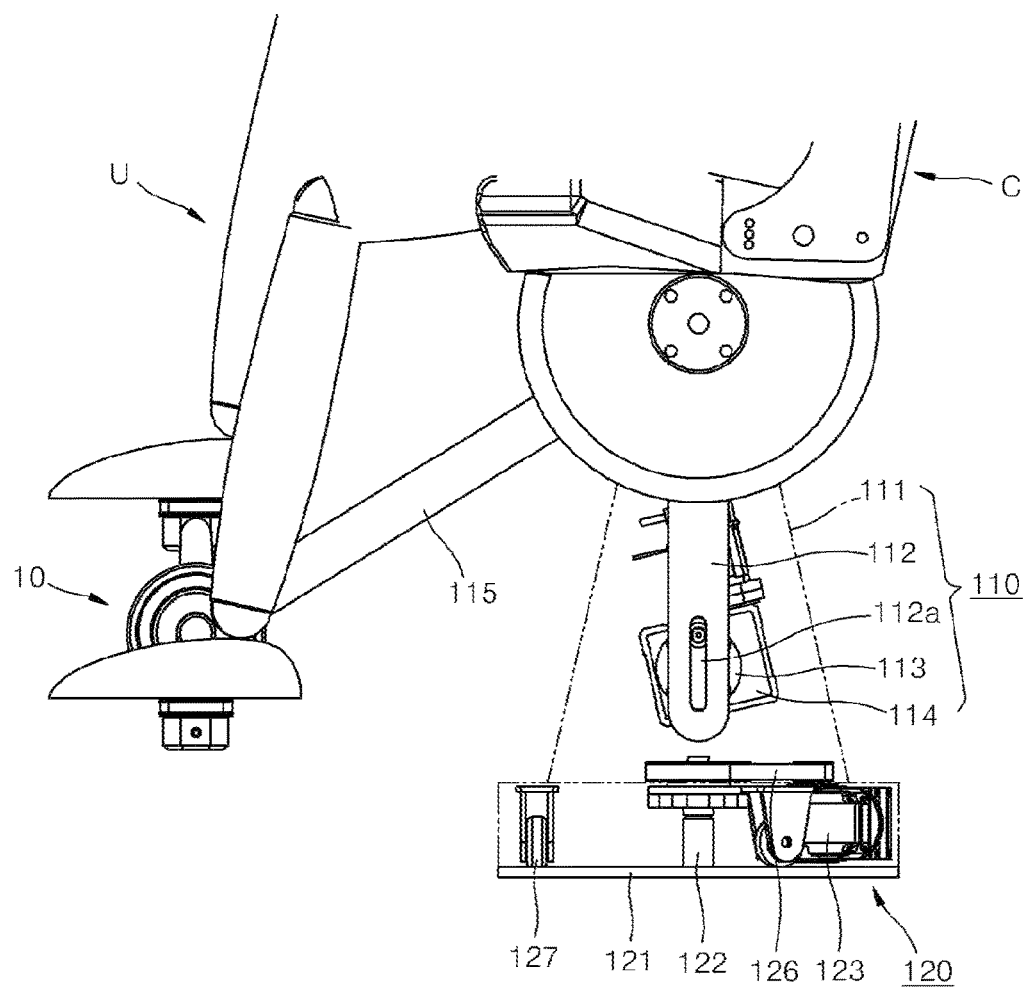
Figure 10B:
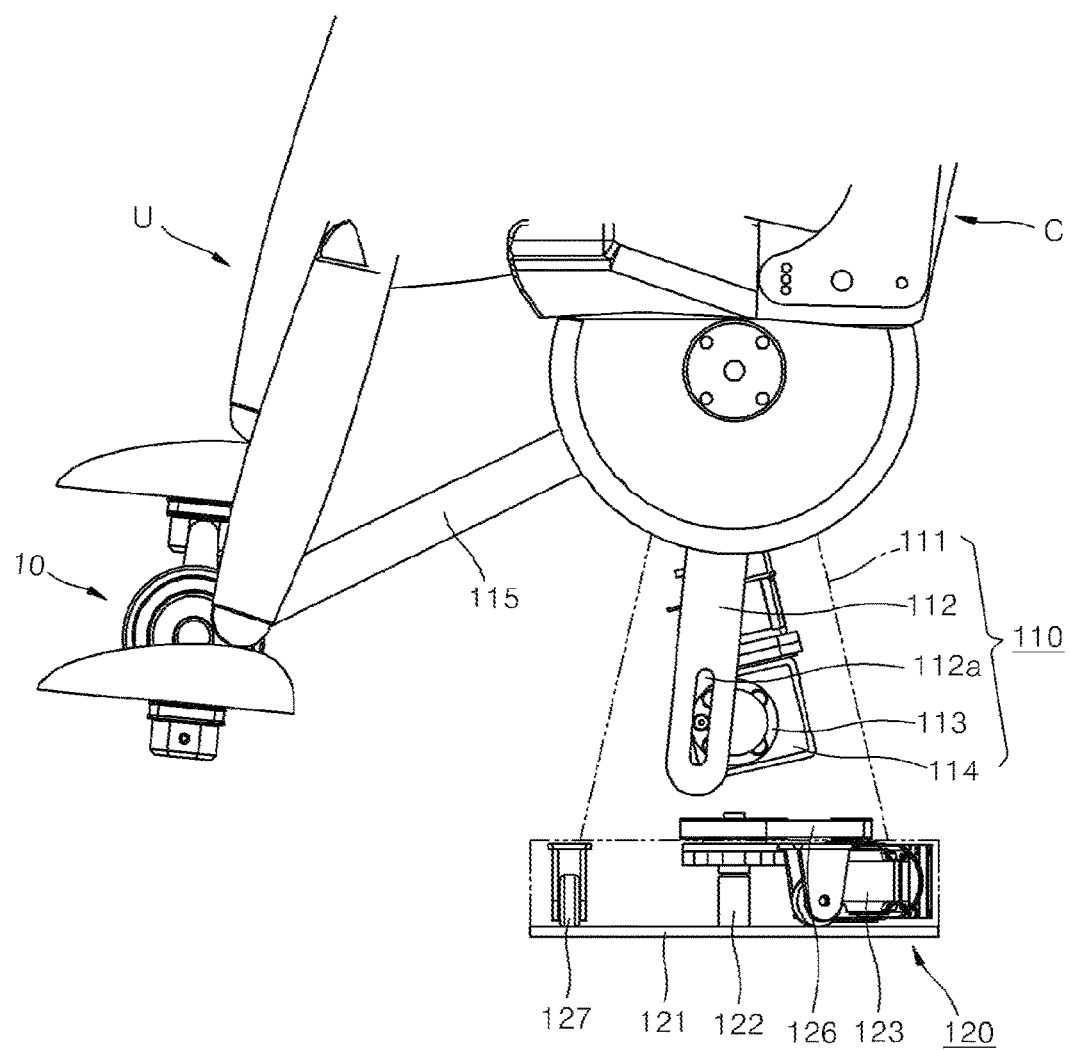

That is, as illustrated in FIG. 10A, in the state in which no inertia phenomenon acts on the player in the game, when the user U runs at a high speed to follow the player in the game, the forward-and-backward rotation detector 40 detects the direction in which and the speed at which the user U runs and transmits the sensed signal. Thereby, as illustrated in FIG. 10B, the cam motor 114 is driven forward, causing the fluctuating link 112 to pivotably rotate forward, whereby the chair C is tilted backward so that the user U can directly feel the inertia phenomenon that acts on the player in the game.

Figure 10C:
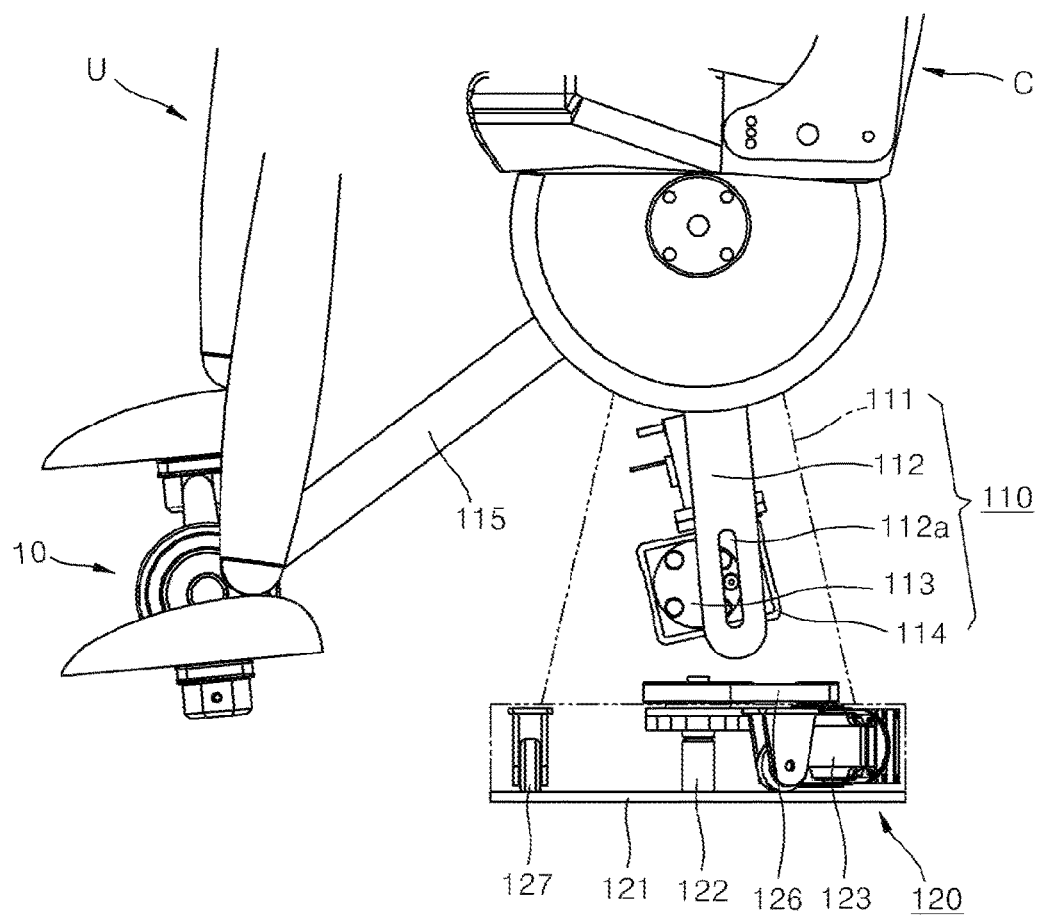

Conversely, when the player in the game stops running, as illustrated in FIG. 10C, the cam motor 114 is driven in reverse, causing the fluctuating link 112 to pivotably rotate backward, whereby the chair C is tilted forward so that the user U can feel the inertia phenomenon that acts on the player in the game.

Figure 11:
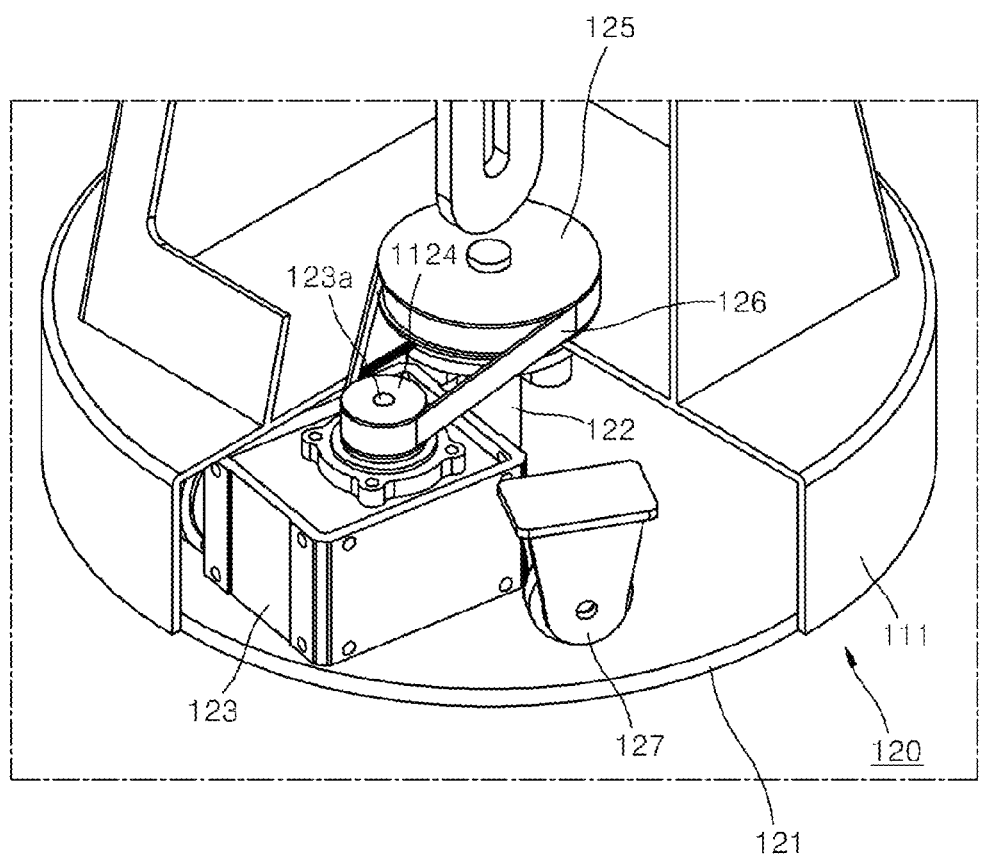
FIG. 11 is a partially cut away perspective view illustrating a leftward-and-rightward rotation unit of the embodiment illustrated in FIG. 7.
Figure 12:
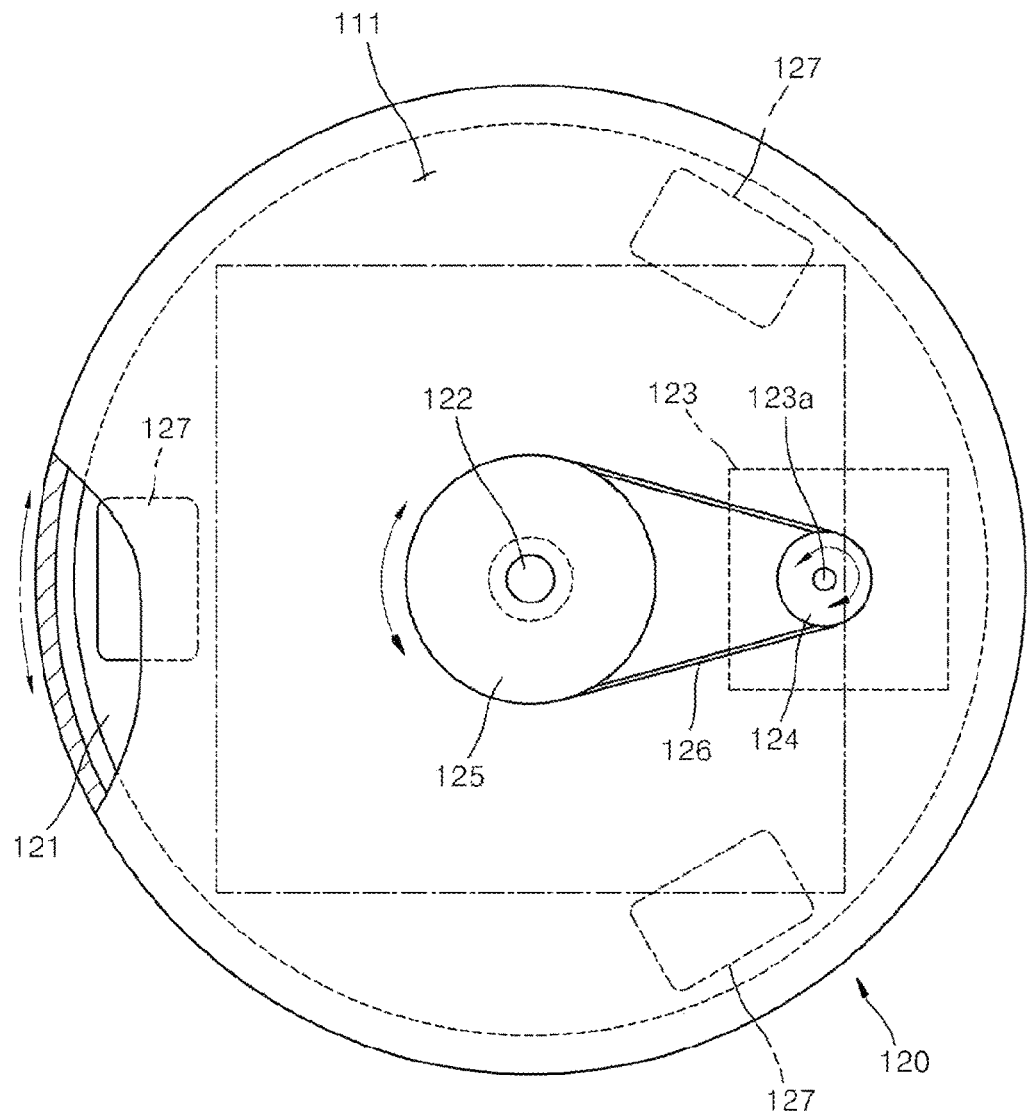
FIG. 12 is a partially cut away plan view of the leftward-and-rightward rotation unit illustrated in FIG. 9.

The leftward-and-rightward rotation unit 120, as illustrated in FIGS. 11 and 12, includes a base 121, which supports the chair C so as to be rotatable leftward and rightward, and a swing motor 122, which pivotably rotates the chair C leftward and rightward in response to the signal of the swing detector 30.

To this end, the base 121 includes a hinge shaft 122, which is provided on the center of the upper surface thereof so as to protrude vertically upward therefrom and serves to rotatably support the pedestal 111 of the forward-and-backward pivotable rotation unit 110. The swing motor 122 is fixed to the lower surface of the pedestal 111, and includes a driving pulley 124 provided around a rotating shaft 123a thereof. The driving pulley 124 is connected to a driven pulley 125, which is fixed to the pedestal 111 and is rotatably coupled to the hinge shaft 122 of the base 121, via a belt 126.

In addition, to ensure more stabilized and smooth rotation of the chair C, a plurality of wheels 127 may be radially provided on the lower surface of the pedestal 111 so as to come into rolling contact with the upper surface of the base 121.

Thus, when the user U rotates the swing footrest 20 provided on each crank pedal 15 of the crank pedal unit 10 leftward and rightward, the swing detector 30 detects the direction and the angle thereof and transmits the detected signal. As the swing motor 123 of the leftward-and-rightward rotation unit 120 rotates forward and in reverse, the chair C is rotated leftward and rightward.

Simultaneously with this, the game program 80 changes the direction of the player in the game and moves the display 90 in response to the signal of the swing detector 30, which may allow the user U to feel a sense of reality as if the user were acting as the player in the game.

Meanwhile, the rotation experience drive unit 100 described above may include both the forward-and-backward pivotable rotation unit 110 and the leftward-and-rightward rotation unit 120, or may include only one of them depending on the characteristics of the game, and the like.

INDUSTRIAL APPLICABILITY

A bicycle-type game simulation device according to the present invention includes a crank pedal unit 10, a swing footrest 20, which is horizontally rotatably installed to a crank pedal 15 of the crank pedal unit 10, a plurality of swing detectors 30, which detects the leftward-and-rightward rotations of the swing footrest 20 and transmits a signal thereof, and a forward-and-backward rotation detector 40, which detects the forward/reverse rotation of a crankshaft 12 of the crank pedal unit 10 and transmits a signal thereof.

Accordingly, when the user operates the bicycle-type game simulation device as if he/she were riding a bicycle by stepping on the footrest 20 and rotating the crankshaft 12, the bicycle-type game simulation device selectively provides the user with leftward/rightward rotation depending on the rotation of the swing footrest 20 and forward/backward rotation depending on the forward/reverse rotation of the crankshaft 12, and thus has industrial applicability as a practical device that enables three-dimensional game play.

The invention claimed is:

1. A bicycle-type game simulation device comprising:
   a crank pedal unit including a crankshaft, a pair of crank arms respectively fixed at one end thereof to opposite ends of the crankshaft so as to be angularly diametrically opposed to each other, a pedal shaft rotatably supported by a free end of each crank arm, and a crank pedal rotatably coupled to the pedal shaft;

a swing footrest horizontally rotatably installed to the crank pedal;

a swing detector configured to detect leftward/rightward rotation of the swing footrest and transmit a detected signal thereof; and a forward-and-backward rotation detector configured to detect forward/reverse rotation of the crankshaft and transmit a signal thereof.

2. The device according to claim 1, wherein the swing detector detects the leftward/rightward rotation of the swing footrest by detecting rotation of a hinge shaft by which the swing footrest is rotatably coupled to the crank pedal.

3. The device according to claim 2, wherein the swing detector transmits the detected signal thereof in a wireless transmission manner.

4. The device according to claim 3, wherein the swing detector further includes a battery installed in the crank pedal to supply power to the swing detector.

5. The device according to claim 4, further comprising an electric generator configured to charge the battery via rotation of the crankshaft.

6. The device according to claim 1, further comprising a swing transmitter configured to transmit the leftward/rightward rotation of the swing footrest to the pedal shaft, wherein the swing detector detects the leftward/rightward rotation of the swing footrest by detecting forward/reverse rotation of the pedal shaft.

7. The device according to claim 6, wherein the swing transmitter includes driving and driven bevel gears fixed respectively to the swing footrest and the pedal shaft and engaged with each other, and wherein the swing detector is installed in the crank pedal.

8. The device according to claim 6, wherein the swing transmitter includes driving and driven bevel gears fixed respectively to the swing footrest and the pedal shaft and engaged with each other, a swing detection guide rotatably coupled to the crankshaft, and a linkage unit configured to link the pedal shaft and the swing detection guide to each other, and wherein the swing detector detects forward/reverse rotation of the swing detection guide.

9. The device according to claim 6, wherein the swing detector transmits the detected signal thereof in a wireless transmission manner.

10. The device according to claim 9, wherein the swing detector further includes a battery installed in the crank pedal to supply power to the swing detector.

11. The device according to claim 1, further comprising a swing footrest movement prevention unit configured to prevent the swing footrest and the crank pedal from moving without a user operation.

12. The device according to claim 11, wherein the swing footrest movement prevention unit includes a first timing pulley fixed to the crank pedal, a second timing pulley rotatably coupled to the crankshaft, and a timing belt coupling the first and second timing pulleys.

13. A bicycle-type game simulation device comprising:
a crank pedal unit including a crankshaft, a pair of crank arms respectively fixed at one end thereof to opposite ends of the crankshaft so as to be angularly diametrically opposed to each other, a pedal shaft rotatably supported by a free end of each crank arm, and a crank pedal rotatably coupled to the pedal shaft;

a swing footrest horizontally rotatably installed to the crank pedal;

a plurality of swing detectors configured to detect leftward/rightward rotation of the swing footrest and transmit a detected signal thereof;

a forward-and-backward rotation detector configured to detect forward/reverse rotation of the crankshaft and transmit a signal thereof; and a forward-and-backward pivotable rotation unit configured to pivotably rotate a chair on which a user sits forward and backward in response to the signal of the forward-and-backward rotation detector.

14. The device according to claim 13, wherein the forward-and-backward pivotable rotation unit includes a pedestal pivot-connected to a lower surface of a seat of the chair, a fluctuating link having a vertically elongated hole and fixed to the seat of the chair, a cam provided on the pedestal so as to be coupled to the elongated hole in the fluctuating link, and a cam motor configured to drive the cam forward or in reverse in response to the signal of the forward-and-backward rotation detector.

15. A bicycle-type game simulation device comprising:
a crank pedal unit including a crankshaft, a pair of crank arms respectively fixed at one end thereof to opposite ends of the crankshaft so as to be angularly diametrically opposed to each other, a pedal shaft rotatably supported by a free end of each crank arm, and a crank pedal rotatably coupled to the pedal shaft;

a swing footrest horizontally rotatably installed to the crank pedal;

a plurality of swing detectors configured to detect leftward/rightward rotation of the swing footrest and transmit a detected signal thereof;

a forward-and-backward rotation detector configured to detect forward/reverse rotation of the crankshaft and transmit a signal thereof; and a leftward-and-rightward rotation unit configured to pivotably rotate a chair on which a user sits leftward and rightward in response to the detected signal of the swing detectors.

16. The device according to claim 15, wherein the leftward-and-rightward rotation unit includes a base configured to support the chair so as to enable leftward/rightward rotation of the chair, and a swing motor configured to pivotally rotate the chair leftward and rightward in response to the signal of the swing detectors.

17. The device according to claim 16, wherein the chair includes a plurality of wheels that guides rotation of the chair.

18. A bicycle-type game simulation device comprising:
a crank pedal unit including a crankshaft, a pair of crank arms respectively fixed at one end thereof to opposite ends of the crankshaft so as to be angularly diametrically opposed to each other, a pedal shaft rotatably supported by a free end of each crank arm, and a crank pedal rotatably coupled to the pedal shaft;

a swing footrest horizontally rotatably installed to the crank pedal;

a plurality of swing detectors configured to detect leftward/rightward rotation of the swing footrest and transmit a detected signal thereof;

a forward-and-backward rotation detector configured to detect forward/reverse rotation of the crankshaft and transmit a signal thereof;

a forward-and-backward pivotable rotation unit configured to pivotably rotate a chair on which a user sits forward and backward in response to the signal of the forward-and-backward rotation detector; and a leftward-and-rightward rotation unit configured to pivotably rotate a chair on which a user sits leftward and rightward in response to the detected signal of the swing detectors.

19. The device according to claim 18, wherein the forward-and-backward pivotable rotation unit includes a pedestal pivot-connected to a lower surface of a seat of the chair, a fluctuating link having a vertically elongated hole and fixed to the seat of the chair, a cam provided on the pedestal so as to be coupled to the elongated hole in the fluctuating link, and a cam motor configured to drive the cam forward or in reverse in response to the signal of the forward-and-backward rotation detector.

20. The device according to claim 18, wherein the leftward-and-rightward rotation unit includes a pedestal pivot-connected to a lower surface of a seat of the chair, a base configured to support the pedestal so as to enable leftward/rightward rotation of the pedestal, and a swing motor configured to pivotally rotate the pedestal leftward and rightward in response to the signal of the swing detectors.

\* \* \* \* \*